(12) United States Patent
Skowron

(10) Patent No.: US 7,657,360 B2
(45) Date of Patent: Feb. 2, 2010

(54) FREQUENCY ANALYSIS SYSTEM AND METHOD FOR DETECTING IMPROPER ACTUATION SYSTEM PERFORMANCE AND ELEMENT OPERATION

(75) Inventor: John Skowron, Huntington Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 482 days.

(21) Appl. No.: 11/549,197

(22) Filed: Oct. 13, 2006

(65) Prior Publication Data

US 2008/0088850 A1    Apr. 17, 2008

(51) Int. Cl.
F02D 41/30    (2006.01)

(52) U.S. Cl. .................. 701/103; 123/339.15; 123/436; 701/111

(58) Field of Classification Search ............ 123/339.15, 123/436, 478, 479, 568.16; 701/1–105, 111, 701/114; 318/561; 251/129.05, 129.08; 700/32, 37–39, 71; 361/152, 153, 160; 215/129.05, 215/129.08; 316/152, 153, 180
See application file for complete search history.

(56) References Cited

U.S. PATENT DOCUMENTS

| | | | |
|---|---|---|---|
| 5,917,919 A * | 6/1999 | Rosenthal | 381/71.11 |
| 6,543,588 B1 * | 4/2003 | Raad | 188/267 |
| 6,581,382 B2 * | 6/2003 | Weber et al. | 60/602 |
| 6,701,244 B2 * | 3/2004 | Oota et al. | 701/104 |
| 6,722,347 B2 * | 4/2004 | Sanchez et al. | 123/520 |
| 6,736,094 B2 * | 5/2004 | Ekdahl et al. | 123/90.15 |
| 6,742,381 B2 * | 6/2004 | Maeno | 73/11.01 |
| 6,865,466 B2 * | 3/2005 | Voight et al. | 701/53 |
| 7,150,152 B2 * | 12/2006 | Kilkenny et al. | 60/612 |
| 7,192,005 B2 * | 3/2007 | Denyer et al. | 251/129.08 |
| 2007/0283695 A1 * | 12/2007 | Figura | 60/601 |

* cited by examiner

*Primary Examiner*—Stephen K Cronin
*Assistant Examiner*—Johnny H Hoang

(57) ABSTRACT

Dither frequency analysis systems include a controller for directing a control signal and a dither frequency to an actuation driver. One or more sensors are used for receiving and relaying a signal downstream from an actuation element, which downstream signal includes the dither frequency. A frequency analysis device receives and analyzes the downstream dither frequency and directs the same to a controller that is configured to evaluate the analyzed downstream dither frequency, and evaluate whether the same indicates proper or improper actuation system operation. The downstream dither frequency is analyzed and evaluated at a frequency of less than about one second, and the frequency analysis device analyzes downstream dither frequencies in the range of from about 50 to 500 hertz. The system can include algorithms and test sequences to address and/or further evaluate improper actuation system operation.

20 Claims, 3 Drawing Sheets

FREQUENCY ANALYSIS SYSTEM AND METHOD FOR DETECTING IMPROPER ACTUATION SYSTEM PERFORMANCE AND ELEMENT OPERATION

FIELD OF THE INVENTION

This invention relates to actuation systems used to activate one or more movable mechanisms and techniques used with such actuation systems and related control systems and, more particularly, to control systems used with actuation systems that are configured using an actuation signal and a dither frequency, wherein the frequency is analyzed and evaluated to determine the state of the actuation system and the one or more movable mechanisms included therein, and wherein proactive restorative action can be rapidly implemented to improve actuation service life.

BACKGROUND

Systems used to control the movement of devices, e.g., actuation systems, are known in the art and are employed for the purpose of causing one or more devices or elements to be activated or moved in a desired manner in response to an actuation signal. An example of an actuation system application includes one where the system is used to control one or more devices of an internal combustion engine, e.g., a gasoline or diesel engine used to power a vehicle. Actuation systems use for such applications can be configured to activate or cause a desired movement of one or more different mechanical devices or elements that influence engine operation, and which movement can depend on particular engine operation conditions. Examples of particular types of mechanical devices or elements that are activated depend on the type of internal combustion engine and its particular application.

In an example where the internal combustion engine includes a turbocharger, an actuation system for such application can be used to control the positioning of elements that are used in conjunction with the turbocharger, such as waste gates, EGR valves, by-pass valves or the like. When the turbocharger used with the internal combustion engine is a variable geometry turbocharger comprising one or more variable geometry elements, e.g., comprising a plurality of movable vanes disposed within the turbocharger turbine and/or compressor housing, the actuation system used with this type of turbocharger can be coupled to an actuator that effects and controls the movement and positioning of such vanes within the turbocharger depending on the engine operating conditions.

Because such activatable mechanical elements are sometimes known to encounter resistance to movement during operation, actuation systems known in the art are configured to not only provide a control signal to effect the desired amount of device movement, but are configured to intentionally introduce what is referred to as a dither frequency to the control system signal. The system dither is provided at a desired frequency that is calculated to overcome any mechanical or magnetic field effects that could otherwise operate to impair the desired movement of the element. The dither frequency used for this purpose will vary from actuation system to actuation system, but is generally configured to offset the unwanted mechanical and/or magnetic field effects known to exist during operation of the actuation system and its elements to help prevent the elements from sticking or binding during desired actuation movement.

Although actuation systems known in the art incorporate the use of dither to help protect against unwanted binding and/or sticking of elements in an actuation system, there are a number of instances where the use of dither, while effective for some amount of time, does not operate to prevent binding and sticking that will eventually occur and that can impair the desired operation of the actuation elements and the performance of the internal combustion engine. Thus, actuation systems are known to fail in the field due to reduced movement/binding of these elements that can be caused by increased friction, the presence of contaminants, corrosion, and the like. The failure of such movable elements to perform as intended, which can eventually result in failure of the device, and which initially results in poor performance and increased emissions, which are also not desirable.

It is, therefore, desired that a system and/or method be developed that is capable of both operating to help address or delay the onset of binding (or otherwise improper operation) of mechanical elements in an actuation system, as well as provide feedback as to the status of the mechanical element and its relative functionality within the actuation system. This is desired for the purpose of enabling one to be able to take preventative action based on the obtained system feedback in making what could be a proactive adjustment, a relatively minor repair or regular maintenance, thereby avoiding what could result in a poor device performance and/or eventual part failure that could cause a more costly repair or nonrepairable replacement.

SUMMARY OF THE INVENTION

Dither frequency analysis systems of this invention are useful for monitoring an actuation control system comprising one or more actuation elements. Such dither frequency analysis systems include a controller for directing a control signal to an actuation driver, wherein the control signal includes a dither frequency. The system further includes one or more sensors for receiving and relaying a signal downstream from the one or more actuation elements, wherein the downstream signal includes the dither frequency. A frequency analysis device is provided for receiving and analyzing the downstream dither frequency or, and directing the same to the controller.

The controller is configured to evaluate the analyzed downstream dither frequency, and evaluate whether such analyzed downstream dither frequency indicates proper or improper actuation system operation. In an example embodiment, the downstream dither frequency is analyzed and evaluated at a frequency of less than about one second. In an example embodiment, the frequency analysis device is configured to analyze downstream dither frequencies in the range of from about 50 to 500 hertz.

Dither frequency analysis systems of this invention can further include one or more algorithms specially developed to address a particular type of identified improper actuation system operation. The system is configured to implement the one or more algorithms into the actuation control system in the event that an improper actuation system operation is detected. In an example embodiment, the system is configured to implement the one or more algorithms into the control system in a manner such that operation of the same is transparent to a user of an apparatus comprising the actuation control system.

Dither frequency analysis systems of this invention can further include one or more test sequences developed to assist in further evaluating improper actuation system operation as detected by analysis of the downstream dither frequency. The system can be configured to implement the one or more test sequences into the control system in the event that such improper actuation system operation is detected. Further, the system can be configured such that the system implements the one or more test sequences into the control system in a manner such that operation of the same is transparent to a user of an apparatus comprising the actuation control system.

Configured in this manner, dither frequency analysis systems of this invention are capable of operating to help address or delay the onset of binding of mechanical elements in an actuation system, as well as provide feedback as to the status of the mechanical element and its relative functionality within the actuation system. Dither frequency analysis systems of this invention enabling preventative actions to be initiated based on the obtained system feedback, thereby avoiding instances of poor device performance and/or eventual part failure that could otherwise cause a more costly repair or nonrepairable replacement.

BRIEF DESCRIPTION OF THE DRAWINGS

Details and features of the present invention will become more clearly understood with respect to the detailed description and drawings in which.

DETAILED DESCRIPTION

Dither frequency analysis (DFA) systems and methods of this invention make use of a dither frequency that is intentionally incorporated into an actuation or control signal for the purpose of overcoming mechanical and magnetic field effects that could adversely impair desired movement of an actuation element, and are further configured to monitor and analyze the dither frequency downstream from the actuation process for the purpose of evaluating actuation system performance and the state of the actuated elements. The analysis of such downstream dither frequency provides a fast response detection method for monitoring actuation system performance.

Additionally, DFA systems and methods of this invention can be configured to provide an output signal, e.g., in the form of a cleaning algorithm and/or test sequence, to the actuation system in response to the analyzed dither frequency for the purpose of addressing an identified undesired system performance or system part issue. Configured in this manner, DFA systems and methods of this invention operate to quickly identify problematic actuation system performance or actuation part operating issues, and implement proactive measures, such as cleaning/flush algorithms and/or test sequences, that are targeted to address the identified issue and prevent what could cause poor performance and otherwise potentially develop into a catastrophic event, such as turbocharger over speed.

DFA systems and methods of this invention can be incorporated as part of a larger more comprehensive management system, e.g., when applied for use with a motor vehicle DFA systems and methods of this invention can be incorporated as part of the vehicle or engine management system. Alternatively, DFA systems and methods of this invention can be provided in the form of a stand alone system, packaged and configured to control and analyze the performance of a desired actuation system and/or its functional elements.

Figure 1:
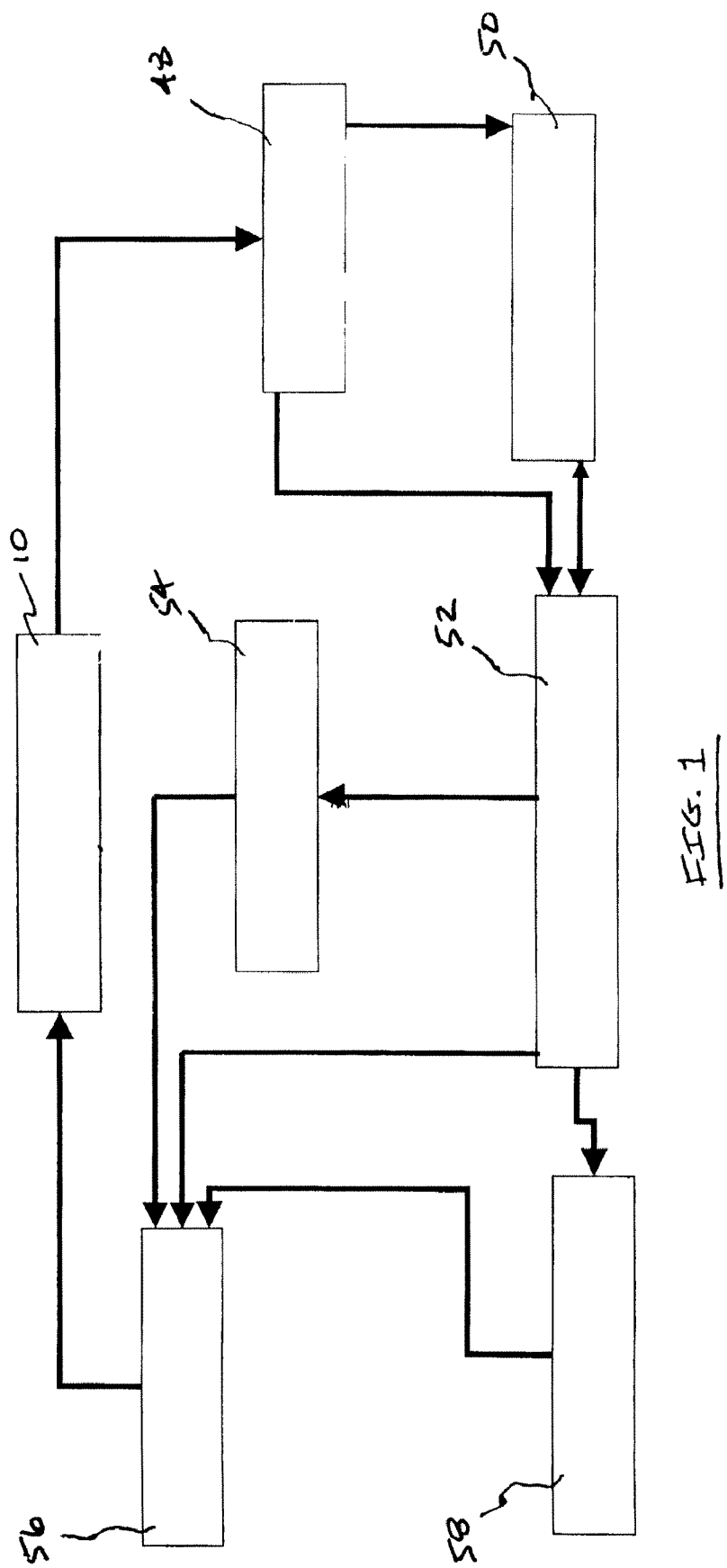
FIG. 1 is a flowchart illustrating the devices and methods used in conjunction with the frequency domain method of an embodiment of this invention.

FIG. 1 illustrates a flow diagram comprising a number of elements and incorporating an example embodiment DFA system and method of this invention as used in conjunction with a turbocharged internal combustion engine system. The internal combustion engine (not shown) can be gasoline or diesel powered, and includes a turbocharger assembly 10 attached thereto for the purpose of producing a desired charge of pressurized air to the engine for subsequent combustion.

Figure 2:
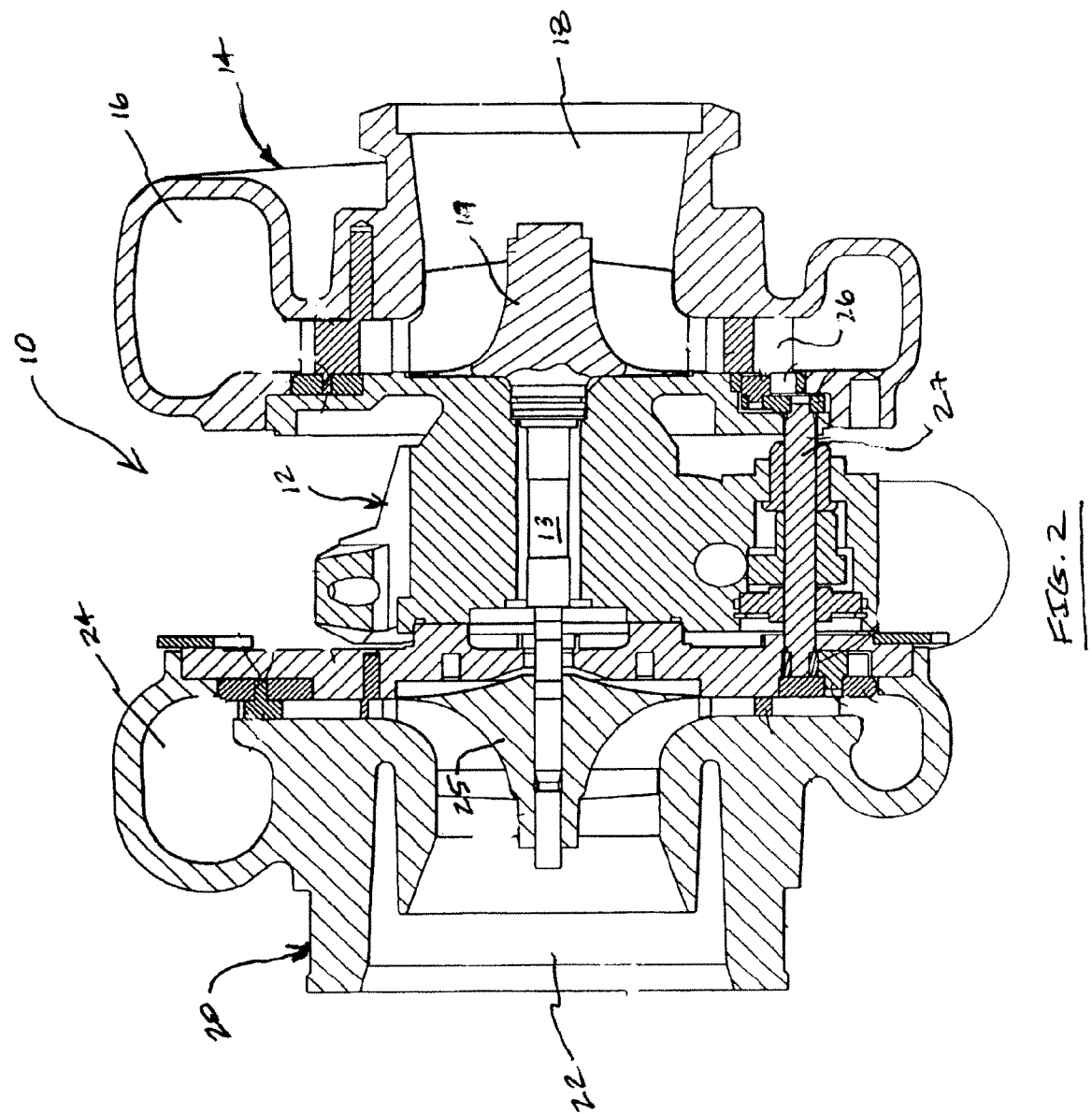
FIG. 2. is a cross-sectional side view of a turbocharger comprising an actuator for activating one or more variable geometry elements within the turbocharger.

An example turbocharger assembly 10 is illustrated in FIG. 2, and generally comprises a center housing 12 containing a common shaft 13 and shaft journal assembly. A turbine housing 14 is attached to the center housing and includes an exhaust inlet 16 and an exhaust outlet 18. A turbine wheel 19 is rotatably disposed within the turbine housing and is attached to an end of the common shaft. A compressor housing 20 is attached to an opposite end of the center housing 12 and includes an air inlet 22 and a pressurized air outlet 24. A compressor impeller 25 is rotatably disposed within the compressor housing 20 and is attached to an opposite end of the common shaft.

Figure 3:
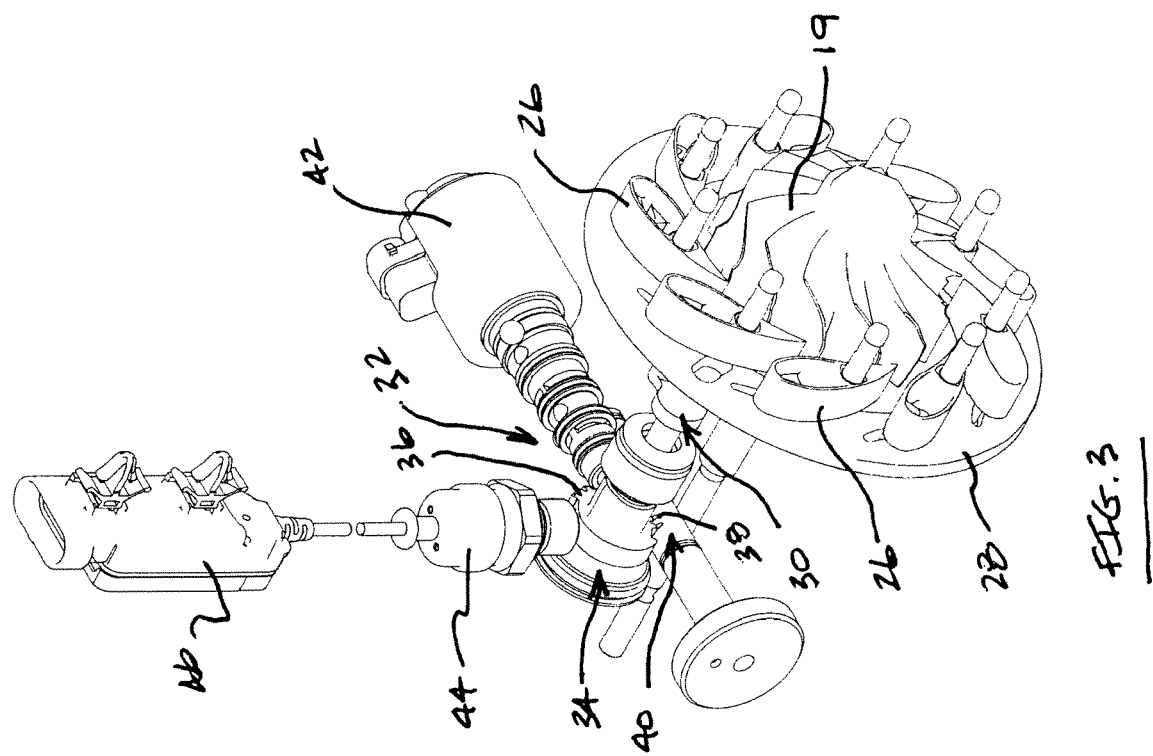
FIG. 3 is a perspective view illustrating a number of actuation elements of a turbocharger assembly as removed from the housing.

FIG. 3 illustrates a number of actuation elements that exist in a variable geometry turbine, and for purposes of reference and clarity such actuation elements are presented without the presence of a turbocharger housing. As illustrated, the variable geometry turbocharger assembly comprises a plurality of vanes 26 that are movably disposed within the turbocharger housing (illustrated as 14 in FIG. 2) and that are positioned generally upstream from the turbine wheel 19. In this example embodiment, the plurality of vanes 26 are attached to a unison ring 28 so that the rotational movement of the unison ring causes all of the vanes to pivot radially relative to the turbine wheel. The unison ring 28 is connected by an appropriate linkage 30 to an actuation assembly 32 that is configured to rotate the unison ring a desired amount to cause the desired vane movement, e.g., to control the size of the exhaust gas passage formed between the vanes.

It is to be understood that the types of components used to form an actuation assembly can and will vary depending on the particular end-use application, and that the components described herein are only representative of those that can be used with this invention, thus such description is not intended to be limiting with respect to the use of this invention with actuation assemblies. In this particular example, the actuation assembly 32 comprises a first gear element 34 that is attached to the linkage 30. The first gear element 34 comprises a gear section 36 that is configured to cooperate with a gear section 38 of a second gear element 40. The second gear element 40 is provided in the form of a piston or the like and is attached to an actuating source 42.

In this example embodiment, the actuating source 42 is provided in the form of a electro-hydraulic solenoid valve or the like that is configured to move the second gear element 40 in an axially directed manner, which causes the first gear element 34 to move in a radially directed manner. Configured in this manner, activation of the actuation source 42 causes rotation of the unison ring 28 and movement of the plurality of vanes 26.

As illustrated in FIG. 3, a variable geometry member, e.g., a vane, sensor 44 is attached to the actuation assembly 32 to provide an indication of the variable geometry member position. In this example embodiment, the vane sensor 44 is attached to the first gear element 34 and is configured to provide an output signal to an appropriate signal conditioning device 46 indicating the position of the plurality of the vanes 26.

The turbocharger may or may not be a variable geometry turbocharger, and it is to be understood that DFA systems and methods of this invention can be used with either type of turbocharger to measure one or more actuation system associated therewith. Generally speaking, DFA systems and methods of this invention can be used to monitor and control actuation systems of turbochargers and their related devices such as waste gates, bypass valves and the like.

Additionally, DFA systems and methods of this invention can be used to monitor and control actuation systems devices other than those directly coupled to turbochargers and their related devices, such as engine emission control devices like EGR valves and the like. Accordingly, while DFA systems and methods of this invention are disclosed and illustrated as being used with a turbocharged engine system, it is to be understood that this is an example application and that other uses of such systems and methods are intended to be within the scope of this invention.

In this particular example, the turbocharger assembly 10 is a variable geometry turbocharger and includes a number of variable geometry elements. As noted above, in a preferred embodiment, such elements are provided in the form of a plurality of aerodynamic vanes 26 disposed within the turbine housing 14 and positioned upstream from the turbine wheel 19. Alternatively, or additionally, the variable geometry elements can be provided in the form of aerodynamic vanes that are disposed within the compressor housing and that are positioned downstream from the compressor wheel. In such variable geometry turbocharger embodiment, one or more actuation members 27 are connected thereto for the purpose of effecting movement of the variable geometry elements, e.g., vanes, to provide desired turbocharger and engine performance over a range of operating conditions. The actuation members can be actuated by hydraulic, electronic, mechanical or pneumatic means via an appropriate actuator.

Referring back to FIG. 1, the DFA system includes one or more sensors 48 that are used for the purpose of receiving and transmitting desired operating parameters of the turbocharger and/or engine. In an example embodiment, the sensors 48 can be remotely positioned or positioned on the turbocharger assembly, and can be configured to monitor such parameters as actuator and/or vane control, the turbine and/or compressor pressures, oil pressure, the position of the variable geometry elements, the position of the actuator, and the like. In one example embodiment, the sensor can be the vane position sensor 44 illustrated in FIG. 3.

It is to be understood that these are just a few examples of some of the different turbocharger parameters that can be monitored by sensors for the purpose of reference, and that that the monitoring of other turbocharger parameters and/or engine parameters are understood to be within the scope of this invention. For example, other sensors that can be used include engine backpressure sensors, turbocharger wastegate position sensors, by-pass valve sensors and the like.

The outputs from such sensors are provided in the form of a waveform voltage signal and/or a waveform current signal. The sensor output includes a pulse width modulation (PWM) frequency or dither frequency (that was initially introduced into the control system and) as it now exists downstream from the actuated device. Thus, depending on the actuation system condition, the dither frequency monitored by the sensor may be modified as a result of the actuation system condition, i.e., the actuation systems performance or the performance of the actuation system functional elements. The output signal from the one or more of sensors 48 is monitored by frequency analysis and/or filtering device 50. The frequency analysis device is configured to perform the monitoring function at a high frequency data collection rate, and analyze the frequency at dither frequency levels.

Again, a feature of DFA systems and methods of this invention is the ability to provide a fast response detection method for monitoring actuation system performance. In an example embodiment, it is desired that DFA systems and methods of this invention enable detection of system performance inconsistencies at a frequency of less than about one second.

In an example embodiment, dither frequencies operate in the 90 to 350 hertz range. Accordingly, it is desired that the frequency analysis devices suitable for use with DFA systems of this invention be those that are capable of operating within this range, and preferably capable of working within a broader frequency range of from about 50 to 500 hertz, to thereby ensure a more complete breadth of frequency analysis capability. It is to be understood that the particular frequency range of the frequency analysis device used with DFA systems of this invention can and will vary depending on the particular end use application, and that the use of frequency analysis devices capable of working with such different frequency ranges are intended to be within the scope of this invention.

In an example embodiment, the downstream actuation system dither frequency can be analyzed by Fourier analysis, or the frequencies not of interest can be filtered using a conventional frequency filtering technique. In an example embodiment, a digital signal processor can be used to conduct the dither frequency analysis with methods such as short time Fourier transform, windowed Fourier transform, or Gabor transform. The dither frequency is analyzed and the results are evaluated for the purpose of determining the state of the actuation system performance and/or the state of the individual actuation system functional elements. In an example embodiment, the downstream dither frequency is analyzed to evaluate its signal strength, as such is useful in providing an indication of system performance and early detection of system or component binding.

In an example embodiment, the analyzed dither frequency is compared to known dither frequencies for the actuation system for the purpose of determining the functional status of the actuation system. Such known actuation system dither frequencies can be stored or otherwise provided by conventional method for the purpose of comparison, and can include dither frequencies that represent a variety of different actuation system performance and/or actuation system part conditions, e.g., dither frequencies that represent proper system and/or functional element performance as well as dither frequencies that represent problematic system and/or functional element performance.

DFA systems and methods of this invention can be configured having predetermined set points relating to dither frequencies indicating problematic actuation system performance and/or actuation system functional element conditions. The use of such set points enable the DFA systems to provide an indication when the analyzed dither frequency represents a problematic actuation system condition. In an example embodiment, the DFA system can be configured to raise or provide a flag when the analyzed dither frequency hits these set points, providing an indication that the actuation system and/or actuation system parts are not functioning within a desired window of acceptable operation, i.e., indicating a particular system performance and/or system part problem.

Output from the analysis and/or filtering device 50 can be directed to a data acquisition (DAQ) controller 52, which if configured to additionally be the engine controller, can also be configured to receive additional inputs from the sensors noted above as well as from other turbocharger and/or engine sensors, the vehicle power supply, the environment, software, and engine calibration.

DFA systems and methods of this invention can be configured having an audio and/or visual warning device that can be activated when an analyzed dither frequency is identified as representing a particular actuation system performance and/or actuation system part problem. Alternatively or in addition, DFA systems and methods of this invention can be configured having a variety of different algorithms 54, that have been specially created for the purpose of addressing a particular problem as identified by the analyzed dither frequency.

In an example embodiment, the DFA system can be configured comprising a number of different cleaning or flush algorithms that are each specially tailored to be implemented in the event that a respective analyzed dither frequency is identified for the purpose of proactively being implemented to address the related actuation system or part problem. In such embodiment, the cleaning and/or flush algorithms can be stored in the system or otherwise provided by conventional means.

Thus, DFA systems of this invention are configured to not only analyze the downstream dither frequency and determine whether such analyzed frequency represents problematic system or part performance, but the system then identifies what the likely problem is by comparison with known dither frequencies for the actuation system, and additionally outputs a signal to the control system for the purpose of addressing or seeking to correct the identified problem via the cleaning and/or flushing algorithm.

For example, in the event that the analyzed dither frequency indicates that a problem exists with a variable geometry element such as an aerodynamic vane in the turbocharger, and that problem is further determined to be a sticking or binding of the vanes, the DFA system (e.g., via the controller 52) identifies the respective cleaning or flushing algorithm calculated to address the sticking of binding and sends a signal to implement the particular cleaning algorithm. The cleaning or flush algorithm signal is then sent to the actuator system, e.g., the vane actuator 56 or actuator driver, that operates to rotate or otherwise move the vanes in a predetermined manner according to the cleaning algorithm calculated to minimize and/or eliminate the identified vane sticking or binding.

It is to be understood that this is just one representative example of how DFA systems of this invention can be configured to include a implement a proactive response to the actuation system for the purpose of addressing the detected problem, and that DFA systems and methods of this invention can be configured to include a number of different cleaning or flush algorithms that are each specially tailored to address a particular actuation system performance and/or actuation system part issue as identified by the analyzed dither frequency.

In an example embodiment, the DFA system is configured such its responsive output, e.g., its cleaning or flush algorithm, is performed in a manner that is transparent to the user, e.g., such that the operator of a vehicle comprising the system is unaware that the DFA system has carried out the response. Accordingly, in an example embodiment, the controller 52 is configured to monitor the turbocharger and/or engine operating conditions, and perform the particular corrective output, e.g., in the form of a cleaning or flush algorithm, during a window of turbocharger and/or engine operation that will not be noticed by the user.

Additionally, the DAQ controller 52 (when provided in the form of an engine management system) is also configured to direct an appropriate control signal to the actuator driver 56 as needed to provide the desired turbocharger and/or engine operating performance.

The use of a cleaning and/or flush algorithm is one example of how DFA systems of this invention can be configured to proactively and rapidly react to an analyzed dither frequency that indicates an unwanted actuation system performance issue. The DFA system reaction time for implementing such cleaning or flush algorithm will depend on the particular system problem identified and the operating condition under which the algorithm can be implemented in a transparent manner to correct the same. In an example embodiment, DFA systems of this invention are capable of identifying and implementing corrective proactive steps within a few seconds. Subsequent proactive steps can be implemented until performance is returned or until a maximum limit is established requiring service.

Alternatively, or in addition to the use of a cleaning or flush algorithm to address an analyzed dither frequency indicative of a system performance and/or system part problem, DFA systems of this invention can be configured including one or more test sequences 58 stored or otherwise available for the purpose being implemented for the purpose of further evaluating and/or focusing on an actuation system performance or part issue identified by the dither frequency analysis. For example, in a situation where the analyzed dither frequency indicates that a problem does exist but is not able to strictly isolate the problem to a particular part or element function, the DFA system may be configured to implement a test sequence that is specifically designed to provide one or more outputs to the control system for the purpose of further evaluating and isolating problem for further treatment.

Accordingly, in an example embodiment, that DFA system includes a number of test sequences that are stored or otherwise available that can be implemented, e.g., by the controller, in the situation noted above. The test sequence my involve sending a number of different signals to the actuation system controller that are more inclusive than standard operation, again for the purpose of further identifying the particular problem. Once a test sequence is implemented, then the downstream resulting dither frequency is again analyzed for the purpose of converging on the particular problem, which may be addressed by subsequently implementing a particular cleaning or flush algorithm. Like the cleaning or flush algorithm, it is desired that the DFA system be configured to implement any such test sequence in a manner that is transparent to the user.

The test sequence can be more or less inclusive than the standard operation, and can be performed under turbocharger and/or engine operating conditions that are different from those used during normal operation. In an example embodiment, the test sequence is carried out to provide a known control signal with a known dither frequency for performing a known change in the turbocharger performance or turbocharger part movement, and the downstream dither frequency provided by the sensors is analyzed for the purpose of evaluating whether the analyzed dither frequency reflects an anticipated response. If the analyzed dither frequency reflects an undesired response, then the system evaluates the response, and provides a cleaning algorithm signal to the actuation driver that is calculated to address the particular issue.

In this example embodiment, the DFA system functions in the following manner. During operation of the vehicle, the dither frequency downstream from the actuation system is constantly being monitored by the dither frequency analysis or filtering device. The analyzed dither frequency is evaluated at a frequency of less than about a second to determine whether the actuation system is performing normally or whether a problem exists with respect to the actuation system or one or more of its functional elements. The evaluation feature can be performed by the DAQ controller.

If the analyzed dither frequency indicates that a problem does indeed exist in the actuation system, and the particular problem is one that is isolated or identified, then the DFA system implements a cleaning or flush algorithm into the actuation control system for the purpose of proactively responding to and addressing the identified problem. In order to improve detection capability, an optional DFA test sequence can be implemented directing the actuation control system to a predictable mode for the purpose of improving test resolution or to further isolate the problem.

If the DFA system identifies the analyzed dither frequency is indicative of a problem, and the problem either is not corrected by implementing a flush or cleaning algorithm, or the specific problem cannot be isolated by implanting a test sequence, then the DFA system may provide an audio and/or visual indication that a further system check and/or maintenance is required, which audio and/or visual indication can then be acted upon by the user to take the vehicle in for appropriate diagnosis and/or servicing.

This is but one example of a DFA system and method of this invention can be configured for use in a turbocharged engine system to analyze and quickly and proactively respond to an actuation system irregularity. It is to be understood that the application of DFA systems and methods of this invention are not to be limited to turbocharger engine systems, and can be used in any type of application comprising a control system where dither is already used with the control signal or can be added thereto. In its most general sense, DFA systems of this invention can be used to monitor and rapidly respond to any actuation systems comprising control systems that include or that are adaptable to include a PWM or dither frequency.

A feature of DFA systems and methods of this invention is the ability to monitor and analyze the downstream frequency in an actuation system at frequencies of less than about a second, and proactively implement a correcting measure (e.g., in the form of a cleaning or flush algorithm, or a test sequence) into the control signal in a manner that is transparent to the user for the purpose of rapidly addressing and correcting an identified problematic performance condition that if left unchecked could otherwise impair proper operation of the system and/or that could eventually case a system failure.

Thus, DFA systems and methods of this invention operate to effectively enhance the service life of the actuation systems being monitored therewith, and additionally operate to improve and extend the duration during which turbochargers and/or engine systems comprising such actuation systems perform as desired, thereby functioning to increase or broaden the effective operating life of such turbochargers and/or engine systems.

Having now described the invention in detail, those skilled in the art will recognize modifications and substitutions to the specific embodiments disclosed herein. Such modifications are within the scope and intent of the present invention.

What is claimed is:

1. A dither frequency analysis system for use in monitoring an actuation control system for actuating one or more actuation elements, the dither frequency analysis system comprising:
   a controller for directing a control signal to an actuation driver, the control signal controlling actuation of at least one of the actuation elements and including a predetermined dither frequency defining a frequency applied to the control signal to overcome mechanical or magnetic effects impairing movement of one or more of the actuation elements;
   one or more sensors for receiving and relaying a signal downstream from the one or more actuation elements, the downstream signal including the dither frequency; and
   a frequency analysis device for receiving and analyzing the downstream dither frequency or directing analysis of the downstream dither frequency to the controller;
   wherein the controller evaluates the analyzed downstream dither frequency and evaluates whether such analyzed downstream dither frequency indicates proper or improper actuation system operation.

2. The dither frequency analysis system as recited in claim 1 further comprising one or more algorithms developed to address a particular type of identified improper actuation system operation, and wherein the system implements the one or more algorithms into the actuation control system in the event that an improper actuation system operation is detected.

3. The dither frequency analysis system as recited in claim 2 wherein the system implements the one or more algorithms into the control system in a manner such that operation of the one or more algorithms is transparent to a user of an apparatus comprising the actuation control system.

4. The dither frequency analysis system as recited in claim 1 further comprising one or more test sequences developed to assist in further evaluating improper actuation system operation as detected by analysis of the downstream dither frequency, and wherein the system implements the one or more test sequences into the control system in the event that such improper actuation system operation is detected.

5. The dither frequency analysis system as recited in claim 4 wherein the system implements the one or more test sequences into the control system in a manner such that operation of the one or more test sequences is transparent to a user of an apparatus comprising the actuation control system.

6. The dither frequency analysis system as recited in claim 1 wherein the actuation control system is used to actuate one or more variable geometry elements within a turbocharger in a turbocharged engine system.

7. The dither frequency analysis system as recited in claim 1 wherein the downstream dither frequency is analyzed and evaluated at a frequency of less than about one second.

8. The dither frequency analysis system as recited in claim 1 wherein the frequency analysis device is configured to analyzes downstream dither frequencies in the range of from about 50 to 500 hertz.

9. The dither frequency analysis system as recited in claim 8 further comprising a filter device that filters out downstream dither frequencies that are outside of the frequency range.

10. A dither frequency analysis system used with an actuation control system for controlling one or more movable elements in a turbocharger engine system comprising:
    a turbocharger assembly comprising a center housing comprising a shaft rotatably disposed therein, a compressor housing attached to one end of the center housing and including a compressor impeller disposed therein and attached to one end of the shaft, a turbine housing attached to an opposite end of the center housing and including a turbine wheel disposed therein and attached to an opposite end of the shaft, and one or more movable members disposed within the turbocharger assembly;
    an actuator that is connected to the one or more movable members;

a controller for directing a control signal to an actuation driver that operates the actuator, the control signal controlling actuation of at least one of the moveable elements and including a predetermined dither frequency defining a frequency applied to the control signal to overcome mechanical or magnetic effects impairing movement of one or more of the moveable elements;

one or more sensors for receiving and relaying a signal downstream from the actuator and one or more movable members, the downstream signal including the dither frequency; and a frequency analysis device for receiving and analyzing the downstream dither frequency and directing analysis of the downstream dither frequency to the controller;

wherein at least one of the controller or frequency analysis device evaluates the analyzed downstream dither frequency and evaluates whether such analyzed downstream dither frequency indicates proper or improper operation of the actuation control system or the one or more movable members.

11. The dither frequency analysis system as recited in claim 10 further comprising one or more cleaning algorithms that are each tailored to address a respective improper operation of the actuation control system or the one or more movable members as evaluated by the analyzed dither frequency.

12. The dither frequency analysis system as recited in claim 11 wherein the controller is configured to implement the one or more cleaning algorithms by introducing the one or more cleaning algorithms to the control system actuation driver.

13. The dither frequency analysis system as recited in claim 12 wherein the controller is configured to implement the one or more cleaning algorithms in a manner that is transparent to a user of the turbocharged engine system.

14. The dither frequency analysis system as recited in claim 10 further comprising one or more test sequences that are each tailored to further evaluate a respective improper operation of the actuation control system or the one or more movable members as evaluated by the analyzed dither frequency.

15. The dither frequency analysis system as recited in claim 14 wherein the controller is configured to implement the one or more test sequences by introducing the one or more test sequences to the control system actuation driver.

16. The dither frequency analysis system as recited in claim 15 wherein the controller is configured to implement the one or more test sequences in a manner that is transparent to a user of the turbocharged engine system.

17. A method for evaluating the operation of an actuation system and its functional elements by monitoring a dither frequency, the method comprising the steps of:

providing a control signal to an actuation driver in an actuation control system and that is connected to one or more movable members, wherein the control signal controls actuation of at least one of the moveable members and includes a predetermined dither frequency defining a frequency applied to the control signal to overcome mechanical or magnetic effects impairing movement of one or more of the moveable members;

receiving the dither frequency downstream from the actuation driver and one or more movable member; and analyzing the downstream dither frequency to determine whether the downstream dither frequency indicates proper or improper operation of the actuation control system, or the one or more movable members.

18. The method as recited in claim 17 further comprising the step of introducing a cleaning signal into the actuation control system for the purpose of addressing identified improper operation of the actuation control system or the one or more movable members.

19. The method as recited in claim 17 further comprising the step of introducing a test sequence into the actuation control system for the purpose of further evaluating an identified improper operation of the actuation control system or the one or more movable members.

20. The method as recited in claim 17 further comprising the step of introducing a signal into the actuation system for the purpose of addressing or further evaluating an identified improper operation of the actuation control system of the one or more movable members, wherein the step of introducing is done in a manner that is transparent to a user of the device comprising the actuation system.

* * * * *

UNITED STATES PATENT AND TRADEMARK OFFICE
CERTIFICATE OF CORRECTION

PATENT NO. : 7,657,360 B2
APPLICATION NO. : 11/549197
DATED : February 2, 2010
INVENTOR(S) : John Skowron It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 594 days.

Signed and Sealed this

Thirtieth Day of November, 2010

David J. Kappos
*Director of the United States Patent and Trademark Office*